United States Patent
Burdick et al.

(10) Patent No.: US 6,828,801 B1
(45) Date of Patent: Dec. 7, 2004

(54) CAPACITIVE SENSOR

(75) Inventors: Kenneth Burdick, Skaneateles, NY (US); Raymond A. Lia, Auburn, NY (US); Robert L. Vivenzio, Auburn, NY (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 94 days.

(21) Appl. No.: 10/058,191

(22) Filed: Oct. 26, 2001

(51) Int. Cl.⁷ .................. G01R 27/26; H01G 7/00
(52) U.S. Cl. ............ 324/658; 324/661; 324/682; 361/283.4; 73/862.626
(58) Field of Search ............... 324/649, 658, 324/661, 662, 681, 682, 686, 688, 71.1; 361/277–286; 73/862.626

(56) References Cited

U.S. PATENT DOCUMENTS

| | | | |
|---|---|---|---|
| 3,716,782 A | 2/1973 | Henry | 324/61 R |
| 3,790,910 A | 2/1974 | McCormack | 235/151.3 |
| 3,805,149 A | 4/1974 | Delapierre | 324/60 C |
| 4,090,513 A * | 5/1978 | Togawa | 128/201.13 |
| 4,295,376 A * | 10/1981 | Bell | 361/283.3 |
| 4,357,429 A | 11/1982 | Blount | 521/100 |
| 4,392,382 A | 7/1983 | Myers | 73/708 |
| 4,586,108 A * | 4/1986 | Frick | 361/283.3 |
| 4,737,706 A | 4/1988 | Eilersen | 324/60 CD |
| 4,806,783 A | 2/1989 | Anderson | 307/118 |
| 5,006,952 A * | 4/1991 | Thomas | 361/283.2 |
| 5,136,262 A | 8/1992 | Spencer | 331/135 |
| 5,148,126 A | 9/1992 | Spencer | 331/135 |
| 5,150,275 A * | 9/1992 | Lee et al. | 361/283.4 |
| 5,172,065 A * | 12/1992 | Wallrafen | 324/683 |
| 5,591,900 A * | 1/1997 | Bronowocki et al. | 73/52 |
| 5,798,462 A * | 8/1998 | Briefer et al. | 73/722 |
| 5,844,769 A * | 12/1998 | Maier | 361/283.4 |
| 6,012,336 A | 1/2000 | Eaton et al. | 73/754 |
| 6,021,674 A | 2/2000 | Roethlingshoefer et al. | 73/756 |
| 6,418,793 B1 * | 7/2002 | Pechoux et al. | 73/714 |
| 6,532,834 B1 * | 3/2003 | Pinto et al. | 361/283.3 |

* cited by examiner

*Primary Examiner*—Anjan Deb
*Assistant Examiner*—Timothy J. Dole
(74) *Attorney, Agent, or Firm*—Wall Marjama & Bilinski LLP

(57) ABSTRACT

A capacitive sensor is disclosed that includes a variable capacitor transducer that varies its capacitance with changes in an environmental parameter. The present invention is adapted to measure any linear parameter such as pressure, force, or distance. The sensor the present invention is compact, inexpensive to make, and easily fabricated using commonly available components. Furthermore, it is not susceptible to errors caused by vibration, acceleration, and its orientation to the earth's gravitational field. The output of the capacitive sensor does not substantially drift with changes in temperature.

43 Claims, 7 Drawing Sheets

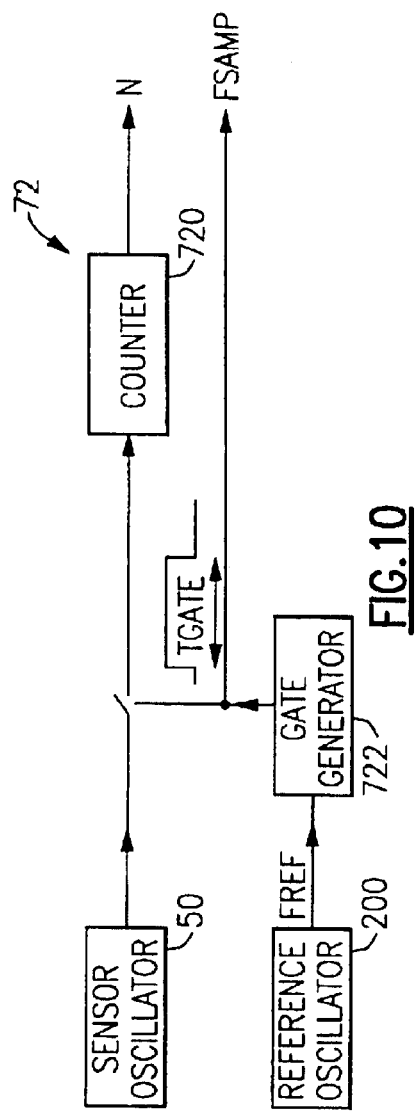
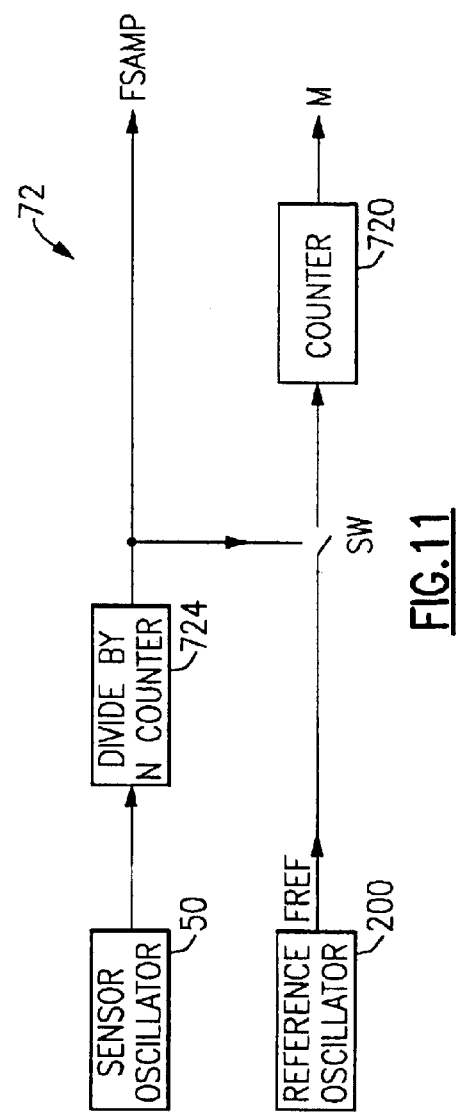

CAPACITIVE SENSOR

BACKGROUND OF THE INVENTION

1. Field of the Invention

The present invention relates generally to fluid pressure sensors, and particularly to capacitive fluid pressure sensors.

2. Technical Background

Capacitive sensors are used widely in a variety of medical and industrial applications to measure linear parameters such as force and pressure. For example, capacitive pressure sensors are used in blood pressure products. They can also be used to measure air or other fluid pressures.

In the conventional approach, the capacitive pressure sensor includes a pressure sensor assembly coupled to an electronic circuit. The pressure sensor assembly includes a port that connects the sensor to the environment. The sensor itself is constructed using a variable capacitor. In this design, one plate of the variable capacitor is formed by attaching a metal plate to a diaphragm. A fixed plate is held at a distance using spacer elements, that are fixed or adjustable. There are several problems with the conventional approach.

Fabrication is difficult and expensive. The variable capacitor is not an off-the-shelf component. The use of a metal plate attached to a diaphragm introduces measurement errors if the planar surface of the attached plate is not parallel to the planar surface of the fixed plate. Further, the attached metal plate has a relatively large mass. This substantially increases the sensor's susceptibility to errors caused by vibration, acceleration, and the sensor's orientation to the earth's gravitational field.

The electronic circuit used in the conventional approach employs a three-inverter oscillator circuit that converts the capacitance of the capacitive transducer to a square wave. The frequency of the square wave is easily measured by a microprocessor, or by some other means. FIG. 1 is an electrical schematic of a conventional three-inverter oscillator circuit. The circuit includes three inverter gates G1, G2, and G3. Typically, each gate includes protection diodes. The biggest problem with the circuit depicted in FIG. 1 is the conduction of the input protection diodes of the threshold detector stage G1. In order to mitigate the effects of the diode conduction, the conventional design employs resistor R3. Depending on its value, R3 either reduces or eliminates the diode conduction. However, as R3 reduces diode errors, it amplifies errors introduced by other components in the oscillator. The direct effect is increased sensitivity to changes in capacitance of the internal circuit at the input of gate G1, thus affecting frequency stability. The group delay of the low-pass filter created by R3 and the input capacitance of G1 causes the sensitivity to most other errors in the sensor to be increased. The ideal situation is where no delays are added to the signal path. The introduction of R3 also changes the effective threshold voltage ($V_{th}$) of gate G1. The conventional design has other problems as well. The circuit board that is used to support the electronics and the means used to support the plates of the variable capacitor C1 include dielectric material that contributes to inter-plate capacitance between the nodes of the circuit, especially between plates of the capacitor C1. Because the dielectric constant of the circuit board supports varies with temperature, the conventional sensor is sensitive to changes in temperature.

What is needed is a compact, inexpensive capacitive sensor that is easily fabricated using commonly available components. A sensor is needed that is not susceptible to errors caused by vibration, acceleration, and sensor orientation to the earth's gravitational field. A sensor is needed that includes an improved oscillator circuit that reduces the effects of diode conduction, including drift over temperature, without the errors introduced by the conventional design.

SUMMARY OF THE INVENTION

The present invention relates to a capacitive sensor that is compact, inexpensive and easily fabricated using commonly available components. The capacitive sensor of the present invention is less susceptible to errors caused by vibration, acceleration, or its orientation to the earth's gravitational field. The capacitive sensor of the present invention includes an improved oscillator circuit that reduces the effects of diode conduction without the errors of the conventional design. Thus, the output of the sensor of the present invention does not substantially drift over temperature.

One aspect of the present invention is a capacitive sensor for measuring a stimulus parameter. The sensor includes a circuit board having at least one metallic layer. A metallic diaphragm is coupled to the circuit board and juxtaposed to the metallic layer to thereby form a transducer capacitor characterized by a capacitance. The metallic diaphragm is adapted to move relative to the at least one metallic layer in response to a change in the stimulus parameter such that the capacitance changes in accordance with the change in the stimulus parameter. An oscillator circuit including a low-pass filter is coupled to the transducer capacitor. The oscillator circuit is configured to generate a filtered signal characterized by a frequency. The frequency changes in accordance with capacitance changes.

In another aspect, the present invention includes a capacitive sensor for measuring a stimulus parameter. The sensor includes a capacitor transducer including a fixed plate member and a variable plate member. The capacitor transducer is characterized by a variable capacitance. The variable capacitance varies in accordance with a change in the stimulus parameter. An oscillator circuit is coupled to the capacitor transducer. The oscillator circuit includes a low-pass filter coupled to an input of the capacitive transducer. The oscillator circuit generates a non-sinusoidal signal having a frequency. The frequency is proportional to the stimulus parameter.

In another aspect, the present invention includes a capacitive sensor system for measuring a stimulus parameter. The system includes a circuit board having at least one metallic layer disposed therein. A metallic diaphragm is coupled to the circuit board to thereby form a variable capacitor. The variable capacitor is characterized by a variable capacitance. The metallic diaphragm is adapted to move relative to the at least one metallic layer in response to a change in a stimulus parameter, such that the capacitance is varied in accordance with stimulus parameter changes. An oscillator circuit is disposed on the circuit board and coupled to the variable capacitor. The oscillator circuit includes a low-pass filter configured to generate a filtered signal characterized by a frequency that changes in accordance with capacitance changes. A processor is coupled to the oscillator circuit. The processor is configured to derive a value of the stimulus parameter from the frequency.

In another aspect, the present invention includes a method for calibrating a capacitive sensor used to measure a stimulus parameter. The method includes providing a sensor including a capacitor transducer and an oscillator circuit, the capacitor transducer being characterized by a variable capacitance that varies in accordance with a change in the stimulus parameter. A correction factor is determined by comparing an initial condition to an ambient condition. The frequency corresponding to the stimulus parameter is determined during ambient conditions. The stimulus parameter is corrected by multiplying the correction factor by the frequency, whereby a corrected frequency value is obtained.

In another aspect, the present invention includes a capacitive sensor for measuring a stimulus parameter. The sensor has a circuit board including at least one metallic layer. A metallic diaphragm is coupled to the circuit board and juxtaposed to the metallic layer to thereby form a transducer capacitor characterized by a capacitance. The metallic diaphragm becomes substantially curved relative to the at least one metallic layer in response to a change in the stimulus parameter such that the capacitance changes in accordance with stimulus parameter changes. An oscillator circuit is coupled to the transducer capacitor. The oscillator circuit is configured to generate a signal characterized by a frequency that changes in accordance with capacitance changes.

In another aspect, the present invention includes a capacitive sensor for measuring a stimulus parameter. The sensor has a circuit board including at least one metallic layer. A metallic diaphragm is coupled to the circuit board and juxtaposed to the metallic layer to thereby form a transducer capacitor characterized by a capacitance. The metallic diaphragm is adapted to move relative to the at least one metallic layer in response to a change in the stimulus parameter such that the capacitance changes in accordance with stimulus parameter changes. A conductive ring is disposed between the metallic diaphragm and the circuit board. A pressure port assembly is coupled to the conductive ring, whereby a cavity is formed between a pressure port and the metallic diaphragm. An oscillator circuit is coupled to the transducer capacitor. The oscillator circuit is configured to generate a signal characterized by a frequency that changes in accordance with capacitance changes.

In another aspect, the present invention includes a capacitive sensor for measuring a stimulus parameter. The sensor has a circuit board including at least one metallic layer. A metallic diaphragm is coupled to the circuit board and juxtaposed to the metallic layer to thereby form a transducer capacitor characterized by a capacitance. The metallic diaphragm is adapted to move relative to the at least one metallic layer in response to a change in the stimulus parameter such that the capacitance changes in accordance with stimulus parameter changes. At least one guard ring is disposed within a thickness of the circuit board. The guard ring is adapted to reduce stray capacitance between the metallic diaphragm and the metallic layer. An oscillator circuit is coupled to the transducer capacitor. The oscillator circuit is configured to generate a signal characterized by a frequency that changes in accordance with capacitance changes.

In another aspect, the present invention includes a capacitive sensor for measuring a stimulus parameter. The sensor has a circuit board including at least one metallic layer. A metallic diaphragm is coupled to the circuit board and juxtaposed to the metallic layer to thereby form a transducer capacitor characterized by a capacitance. The metallic diaphragm does not include an attached metallic plate. The metallic diaphragm is adapted to move relative to the at least one metallic layer in response to a change in the stimulus parameter such that the capacitance changes in accordance with stimulus parameter changes. An oscillator circuit is coupled to the transducer capacitor. The oscillator circuit is configured to generate a signal characterized by a frequency that changes in accordance with capacitance changes.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 10 is a block diagram of the counter circuit shown in FIG. 2 in accordance with a fifth embodiment the present invention;

FIG. 11 is a block diagram of the counter circuit shown in FIG. 2 in accordance with a sixth embodiment the present invention;

DETAILED DESCRIPTION OF THE PREFERRED EMBODIMENTS

Figure 1:
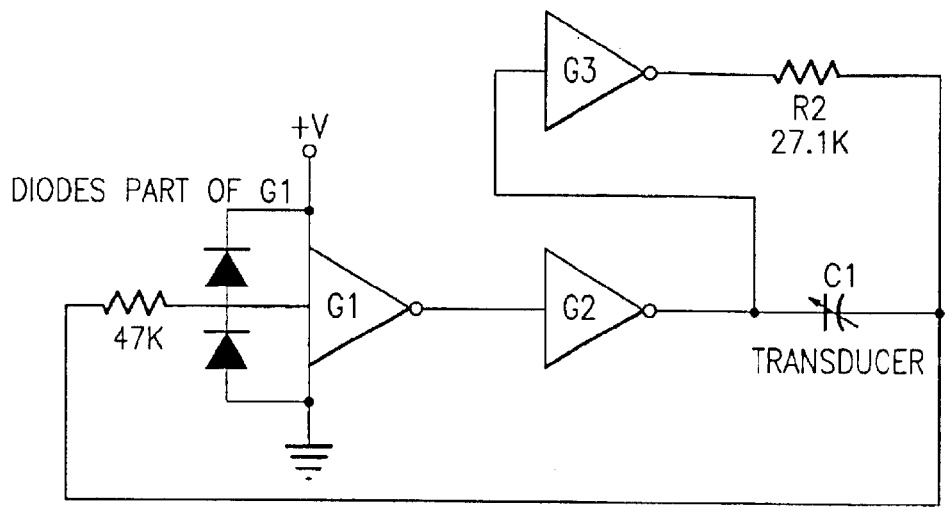
FIG. 1 is a schematic of a conventional three-inverter oscillator circuit.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the capacitive sensor of the present invention is shown in FIG. 2, and is designated generally throughout by reference numeral 10.

In accordance with the invention, the present invention for a capacitive sensor includes a variable capacitor transducer that is adapted to vary its capacitance in accordance with a change in an environmental parameter. The present invention is adapted to measure any linear parameter such as force or pressure. In one embodiment, the variable capacitor transducer of the present invention is formed by juxtaposing a metallic diaphragm to a conductor layer disposed on a circuit board, to thereby provide a sensor that is compact, inexpensive to make, and easily fabricated using commonly available components. Furthermore, it is less susceptible to errors caused by vibration, acceleration, and its orientation to the earth's gravitational field. Finally, the output of the capacitive sensor does not substantially drift with changes in temperature.

Figure 2:
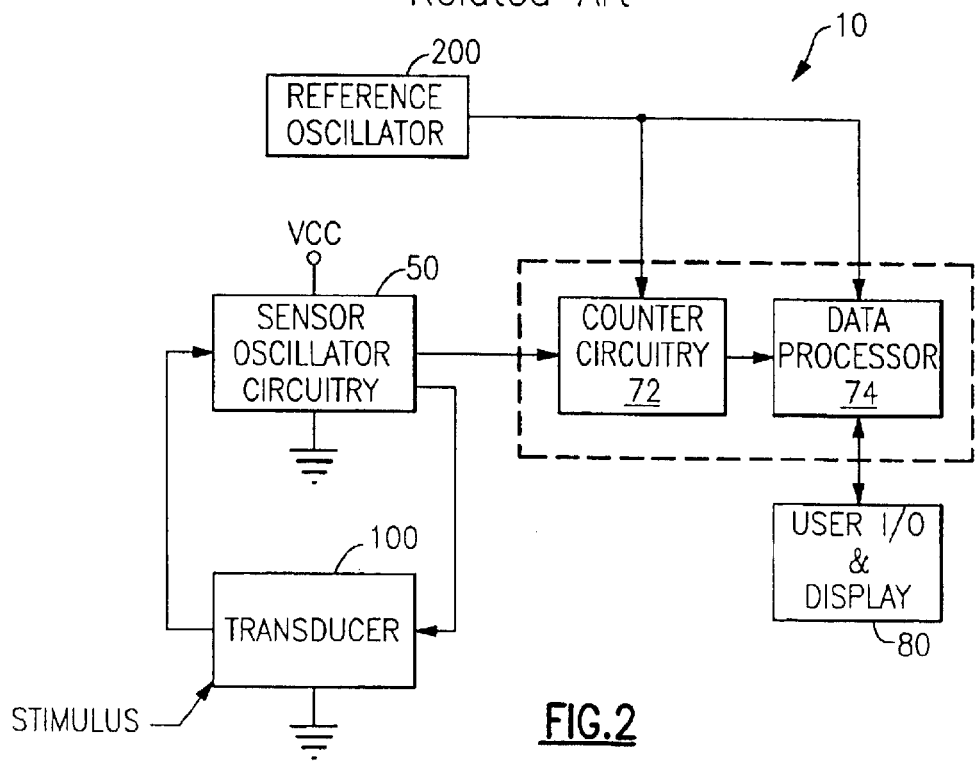
FIG. 2 is a block diagram of the capacitive pressure sensor in accordance with the present invention.

As embodied herein and depicted in FIG. 2, a block diagram of capacitive pressure sensor 10 in accordance with the present invention is disclosed. Sensor 10 includes capacitive pressure sensor transducer 100 connected to oscillator circuit 50. Measurement and Processing circuit 70 is connected to the output of oscillator circuit 50. Measurement/Processing circuit 70 includes counter circuit 72 connected to data processor 74. Both counter circuit 72 and data processor 74 are connected to reference oscillator 200. Processor 74 is also connected to user I/O unit 80.

Capacitive pressure sensor transducer 100 is discussed below in the text associated with FIG. 3, FIG. 4, and FIG. 5. Various embodiments of oscillator circuit 50 are discussed below in the text associated with FIG. 6, FIG. 7, FIG. 8, and FIG. 9. Various embodiments of counter circuit 72 are discussed below in the text associated with FIG. 10, FIG. 11, and FIG. 12. It will be apparent to those of ordinary skill in the pertinent art that data processing unit 74 may be of any suitable type, depending on a variety of factors, including component reliability and cost, but there is shown by way of example a microprocessor. In an alternate embodiment, data processor 70 is implemented using an application specific IC (ASIC). In another alternate embodiment, data processor 74 is implemented using a digital signal processor. User I/O unit 80 includes a keypad and a display.

Essentially, sensor 10 operates as follows. The dynamic portion of transducer 100 is a variable capacitor. As the measured environmental parameter changes, the capacitance changes. Oscillator 50 converts the capacitance into an AC signal. Counter 72 measures the frequency of the AC signal. Processor 74 converts the measured frequency into the parameter(pressure, force, etc.) measurement. The measure parameter is displayed on unit 80.

Figure 3:
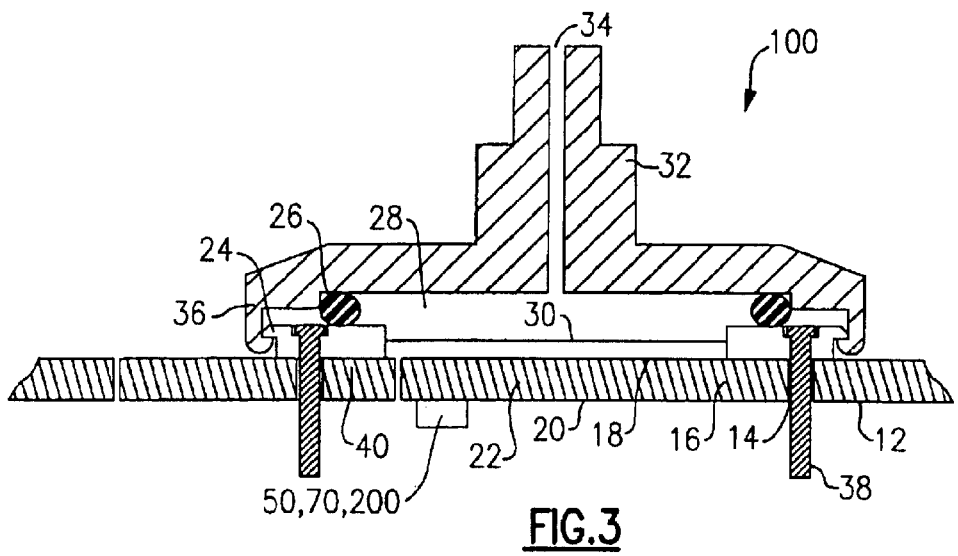
FIG. 3 is a cross-sectional view of the capacitive pressure sensor transducer in accordance with the present invention.

As embodied herein, and depicted in FIG. 3, a cross-sectional view of capacitive pressure sensor 10 in accordance with the present invention is disclosed. Sensor 10 includes metallic conductor layer 18 formed on a surface of circuit board 12. Ground conductor layer 20 is disposed on the opposite surface of circuit board 12. Circuit board 12 also includes dielectric material 22, disposed between conductor layer 18 and ground layer 20. Metal ring 24 is connected to circuit board 12 by pins 38, which are inserted through ring conductor 14. Metal ring 24 receives structural support from support plate 40, which is disposed between circuit board 12 and metal ring 24. Support plate 40 causes conductor layer 18 and the support plane of metal ring 24 to be co-planar, to thereby reduce mechanical tolerance stack-up, Metallic diaphragm 30 is coupled to circuit board 12 by being sandwiched between metal ring 24 and O-ring 26. Thus, metallic diaphragm 30 is disposed over circuit board 12 and juxtaposed to conductor layer 18 to form a variable capacitor. This design feature also has the effect of reducing mechanical tolerance stack-up. Metallic diaphragm 30 is held in place by O-ring 26. O-ring 26 is pressed against metallic diaphragm 30 and metal ring 24 by snap-on cap 32. Snap-on cap 32 includes multiple snaps 36 which fit over the edge of metal ring 24. Snap-on cap 32 also includes pressure port 34. In the embodiment depicted in FIG. 3, the electronics (oscillator 50, measurement and processor circuit 70, and reference oscillator 200) of sensor 10 are coupled to the underside of circuit board 12.

Ring conductor 14, guard rings 16, conductor layer 18, and ground layer 20 may be fabricated using any suitable material, but in the example depicted in FIG. 3, a copper material is used. Metal ring 24 may be fabricated using any suitable material including copper or aluminum based materials. Metallic diaphragm 30 may be fabricated using any suitable type of metallic material, such as silicon, a ceramic material having a metallic layer on the surface, or a copper based foil material, such as beryllium copper.

It will be apparent to one of ordinary skill in the art that transducer 100 includes several salient features and advantages. For example, disposing conductor layer 18 on circuit board 12 to form the stationary plate of the variable capacitor reduces the size, complexity and number of parts in the design. It is also noted that ground layer 20, metallic diaphragm 30, metal ring 24, and guard rings 16 form an enclosure that substantially isolates conductor layer 18 from electrical interference. The enclosure also isolates conductor layer 18 from changes in the capacitance caused by movement of nearby people and objects.

Another salient feature of the invention involves snap-on cap 32. As discussed above, snap-on cap 32 holds metallic diaphragm 30 against metal ring 24 with O-ring 26. This mechanical system symmetrically loads the sealing pressure on metal ring 24, to seal pressure measurement cavity 28 while holding metallic diaphragm 30 firmly in place. Because of the symmetric loading, forces that could warp transducer assembly 100 are substantially reduced. Snap-on cap 32 also allows transducer assembly 100 to be disassembled for servicing and recycling.

Yet another salient feature of the present invention involves metallic diaphragm 30. As discussed above, metallic diaphragm 30 of the present invention is comprised of a metal foil. As it is moved by the fluid pressure toward conductor layer 18, it assumes a curved shape, approximating a section of a sphere. This feature substantially reduces the sensor's sensitivity to errors caused by capacitive plates that are not parallel to each other. The use of the diaphragm rather than an attached plate has other advantages as well. Using the conductive surface of the diaphragm instead of the attached plate substantially reduces the mass of the movable portion of the variable capacitor. Because of the reduced mass, the sensor's measurement errors due to acceleration, changes in orientation with respect to the earth's gravitational field, and vibration are substantially minimized.

Yet another salient feature of the present invention includes the disposition of ground conductor layer 20 and guard rings 16 in circuit board 12, between conductor layer 18 and those conductors connected in common with ring conductor 14. This feature minimizes the contribution of dielectric material 22 to inter-plate capacitance C1. The significance of this is that the performance of the sensor does not vary with temperature induced changes in the dielectric constant of dielectric material 22 in circuit board 12.

In an alternate embodiment of the invention, ground conductor layer 20 is disposed within circuit board 12, instead of being disposed on the surface of circuit board 12.

Again, ground conductor layer 20, metallic diaphragm 30, metal ring 24, and guard rings 16 form an enclosure that substantially isolates conductor layer 18 from electrical interference. As discussed above, this enclosure also isolates conductor layer 18 from changes in capacitance caused by movement of nearby people and objects. However, by placing ground conductor layer 20 within circuit board 12, the electrical components (50, 70, 200) of sensor 10 can be disposed on the underside of circuit board 12 coupled to ground conductor layer 20. Thus, a stand-alone sensor module is created, ideally suited for industrial or automotive applications.

Figure 4:
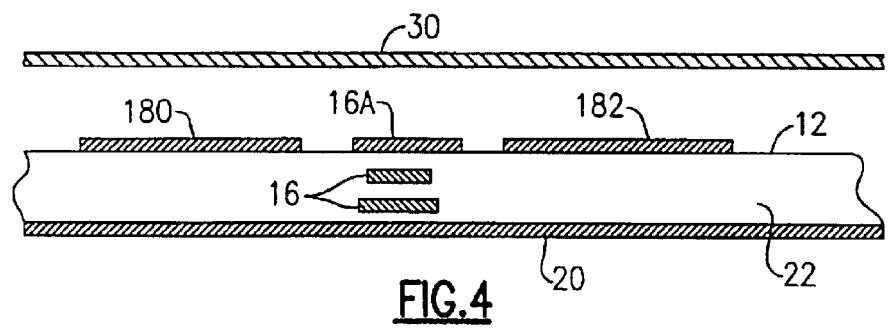
FIG. 4 is a cross-sectional view of an electrode configuration in the capacitive pressure sensor transducer in accordance with a second embodiment of the present invention.

As embodied herein and depicted in FIG. 4, a cross-sectional view of an electrode configuration in capacitive pressure sensor transducer 100 in accordance with a second embodiment of the present invention is disclosed. Printed circuit board 12 is used as the substrate. Circuit board 12 is fabricated using dielectric material 22. Ground layer 20 is disposed on the under-side of circuit board 12. Ground rings 16 are disposed within dielectric mater 22. Outer electrode 180 and inner electrode 182 are co-planar, enclosing ground conductor 16A within the plane of the top-side of circuit board 12. Metallic diaphragm 30 is a ground third electrode in capacitive sensor transducer 100. FIG. 5 is a plan view of the electrode configuration depicted in FIG. 4. As shown, electrode 180 and electrode 182 are arranged in a spiral, serpentine, and/or interdigitated pattern to maximize inter-electrode capacitance. As shown by the "footprint" of diaphragm 30, diaphragm 30 covers the entire area of the co-planar electrode pattern. In the embodiment shown in FIG. 4 and FIG. 5, the mechanical arrangement of capacitive transducer 100 is identical to the one shown in FIG. 3.

Figure 5:
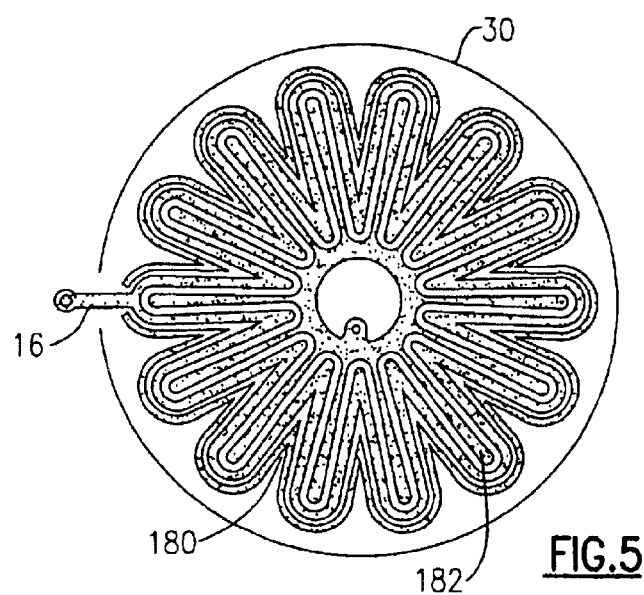
FIG. 5 is plan view of the electrode configuration depicted in FIG. 4.

The benefit of the electrode configuration shown in, FIG. 4 and FIG. 5 is as follows. In standard capacitive pressure sensors, both of the capacitor plate electrodes of the sensing capacitor are un-grounded. As a result, they may propagate AC signals because they act as small antennae radiating AC signals into space. When a metal diaphragm is used, it is more than likely to be electrically connected to one of the plates of the sensor capacitor. Thus, it will also propagate AC signals. Depending on circuit details, the AC signals propagated by the plates may include high-frequency signals that are transmitted by the plates resulting in electromagnetic interference. There are other sources of error, as well. The capacitance of the plates can also be influenced by their proximity to nearby objects. The capacitance plates can serve as antennae carrying external electromagnetic interference into the circuit. Each of these scenarios result in measurement errors. Therefore it becomes necessary to add shielding around the sensor plates to mitigate these effects. Shielding is expensive. The above described electrode configuration substantially mitigates these problems by grounding one of the sensor electrodes, to thereby shield the active electrodes at a very low cost.

As shown, coplanar electrodes 180 and 182 are arranged on the top surface of a substrate forming a capacitor with a substantial amount of its capacitance coming from the electric fields above the plane and some of its capacitance coming from the field passing through circuit board 12. Electrodes 180 and 182 are connected to the circuits that convert the capacitance to a more readily measured quantity, such as frequency or voltage. Metallic diaphragm 30 is a grounded electrode that propagates essentially no AC signal. Diaphragm 30 is arranged so that it moves with respect to electrode 180 and electrode 182 in a direction normal to their plane. As diaphragm 30 moves closer to the plane of electrodes 180 and 182, it cuts into the electric field above them, reducing the capacitance between the first two. As shown in FIG. 5, diaphragm 30 is large enough to cover most or all of the area of electrode 180 and electrode 182, maximizing the desired change in capacitance.

To minimize substrate capacitance between electrodes 180 and 182, grounded conducting layer 20 is located in a plane directly below them. In one embodiment, it is on the lower surface of circuit board 12 (as shown in FIG. 4). In another embodiment, grounded conducting layer 20 is embedded within dielectric material 22. Ground electrode 16A is also coplanar with electrodes 180 and 182, being disposed between electrode 180 and electrode 182. Ground electrode 16A serves to reduce the inter-electrode substrate capacitance.

Grounded diaphragm 30 and grounded conducting layer 20 functions as shielding for electrode 180 and electrode 182. Additional shielding can be added until a complete enclosure is formed around electrode 180 and electrode 182. This may be added by extending diaphragm 30 or using other conductive members that are fixed in relation to electrode 180 and electrode 182. The term "grounded" as used herein, means grounded in the AC sense, and need not be directly connected to circuit ground.

Figure 6:
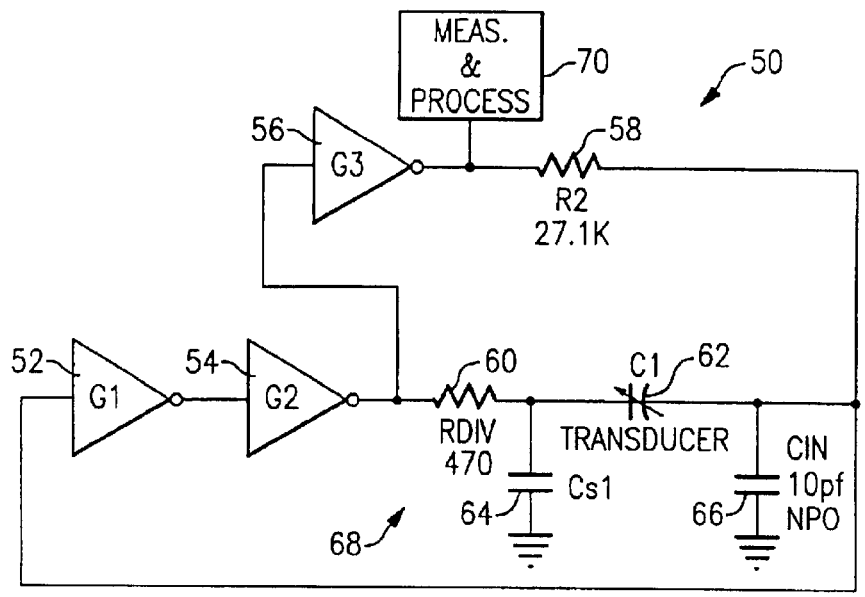
FIG. 6 is a schematic of an improved three-inverter oscillator circuit in accordance with the present invention.

As embodied herein and depicted in FIG. 6, a schematic of oscillator circuit 50 in accordance with the present invention is disclosed. Although oscillator circuit 50 is configured to operate with pressure sensor 10 depicted in FIG. 2, it must be emphasized that oscillator circuit 50 can be used with any type of capacitive sensor. Oscillator circuit 50 includes a first loop having inverter gate 52, inverter gate 54, resistor 60, and capacitive transducer 62 in series. Optional capacitor 66 is connected between the input of inverter 52 and ground. Optional capacitor 64 is connected between the output of resistor 60 and ground. Capacitor 64 and Capacitor 66 are in parallel with stray capacitances that result from the construction of the sensor 10 and the proximity of the oscillator 50 on the circuit board 12 to the ground conductor. Low-pass filter 68 is formed by series resistor 60 in combination with capacitor 64, capacitor 66 and the stray capacitances discussed above. Capacitors forming low-pass filter 68 can be separate components, e.g., capacitor 64 and capacitor 66, or stray capacitances resulting from intentional design choices in the construction of sensor 10 and location of components on the circuit board 12. Oscillator circuit 50 also includes a second loop in parallel with resistor 60 and capacitive transducer 62. The second loop includes inverter gate 56 in series with resistor 58. The output of oscillator circuit 50 is connected to frequency measurement and processing unit 70.

Oscillator circuit 50 is a type of RC relaxation oscillator. The dynamic portion of oscillator circuit 50 is capacitance transducer 62. When power is applied, transducer 62 begins charging up to $V_{cc}$, in accordance with the equation $v(t)=V_{cc}(1-\exp[-t/RC])$. The speed of the response of this circuit is determined by the time constant RC. That is, in one time constant, $v(t)$ builds up to 63.2% of $V_{cc}$. However, when $v(t)$ reaches the inverter threshold voltage $V_{th}$, the polarity of inverter gates 52, 54, and 56 is reversed, and the voltage $v(t)$ is driven to $3V_{cc}/2$. At this point, transducer 62 begins to discharge toward ground, in accordance with the equation $v(t)=(3/2)V_{cc} \exp[-t/RC]$. In one time-constant RC, the voltage across capacitor transducer 62 decays to 36.8% of $(3/2)V_{cc}$. However, when $v(t)$ reaches the inverter threshold voltage $V_{th}$, the polarity of inverter gates 52, 54, and 56 is reversed again. The voltage $v(t)$ is driven to $-V_{cc}/2$ and transducer 62 begins charging up to $V_{cc}$ to begin the cycle anew. In this way, the voltage across capacitor transducer 62 produces a saw-tooth shaped waveform.

Inverter gates 52, 54, and 56 alternate between $V_{cc}$ and ground. For example, if the input voltage to inverter gate 56 is below $V_{th}$, the output of inverter gate 56 will be driven to $V_{cc}$. If the input voltage to inverter gate 56 is above $V_{th}$, the output of inverter gate 56 is grounded. Thus, the output waveform provided by oscillator circuit 50 is a square wave having a frequency inversely proportional to time constant RC. In a nutshell, a change in the parameter being measured produces a change in the capacitance of transducer 62. A change in the capacitance of transducer 62 produces a change in the frequency of the square wave produced by oscillator circuit 50. The frequency of the square wave can easily be measured by frequency measurement and processing unit 70. It will be apparent to those of ordinary skill in the art that gate 52 and gate 54 can be replaced by a single non-inverting gate. It will also be apparent to those of ordinary skill in the art that gate 52 can be replaced by an analog comparator.

It will be apparent to one of ordinary skill in the art that oscillator circuit 50 includes several salient features and advantages. The addition of resistor 60 has the salutary effect of limiting the effects of threshold voltage changes. In one embodiment, resistor 60 is implemented as a part of gate G2. Another salient feature of oscillator circuit 50 includes resistor 60 in combination with capacitor 64. This combination virtually eliminates diode conduction at the zero crossing detector input while substantially reducing the errors introduced by R3 in the conventional design (as discussed above). Capacitor 64 is, in actuality, a combination of various capacitances. Some of which are formed by ring conductor 14 and guard rings 16. As discussed above, the combination of resistor 60 and capacitor 64 also forms low pass filter 68, which substantially reduces RF interference. Yet another salient feature of oscillator circuit 50 is the optional employment of capacitor 66. Capacitor 66 reduces the sensitivity to changes in other parameters in sensor 10. For example, capacitor 66 forms a capacitor divider when combined with the inter-plate capacitance of circuit board 12 (FIG. 2) to substantially reduce diode conduction at the zero-crossing detector input.

Figure 7:
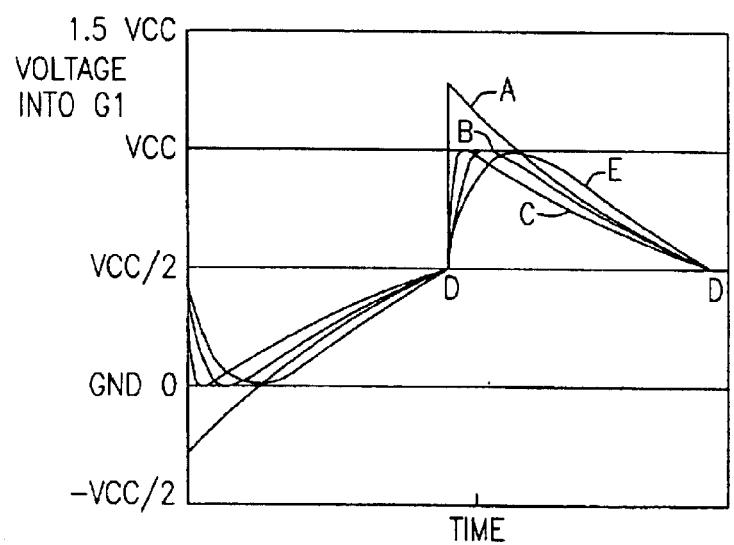
FIG. 7 is a chart showing voltage waveform comparisons between the traditional oscillator circuit shown in FIG. 1 and the three-inverter oscillator circuit depicted in FIG. 6.

FIG. 7 is a chart comparing the waveforms present at the input of gate G1 for the standard oscillator circuit shown in FIG. 1 to the oscillator circuit of the present invention. Waveform A illustrates the performance of the standard oscillator circuit depicted in FIG. 1. As discussed above, the oscillator circuit depicted in FIG. 1 does not include a low-pass filter. When there is no filter, the voltage waveform present at the input of gate G1 is driven beyond VCC and ground. This causes the input protection diodes of G1 to conduct. Waveform E shows the standard circuit depicted in FIG. 1 with the value of resistor R3 being increased to prevent diode conduction by forming a low pass filter at the input of gate G1. The slope of approach to Point-D is improved, but significant group delay is added, and gain errors are introduced. The sensitivity to changes in the internal input capacitance of gate G1 is also significantly increased.

Waveform B illustrates the advantages of adding low-pass filter 68 to oscillator circuit 50 depicted in FIG. 6. The voltage present at the input of gate G1 does not exceed VCC or ground. Diode conduction is eliminated. On the other hand, the slope of the approach to VCC/2 at Point D is somewhat reduced compared to the non-filtered waveform-A, slightly amplifying the noise and offset drift errors of G1. Also some group delay is added, as evidenced by shifting of the waveform to the right. The addition of delay has the harmful effect of amplifying errors caused by drift in other components. Filter 68 has the additional advantage of removing high frequency components in the voltage present on the plates of transducer 62. Thus, filter 68 substantially reduces or eliminates the need for additional shielding to prevent unwanted emissions of radio frequency energy from diaphragm 30 and conductive layer Waveform C illustrates the advantages of adding a stable capacitance (such as an NPO type ceramic capacitor) to capacitance 66 in FIG. 6. Adding capacitor 66 in combination with transducer capacitance 62 forms voltage divider. Series capacitance 62 of the transducer works with capacitor 66 to reduce the voltage presented to the input of gate G1. The effects of the voltage divider are illustrated in FIG. 7 by waveform-C. The slope of the approach to VCC/2 at point D is lower than for waveform A or waveform B with the harmful effect that sensitivity to changes in the threshold voltage and noise of gate G1 is increased. However, the addition of a stable capacitance (such as an NPO type ceramic capacitor) to capacitance 66 reduces the sensitivity of the sensor oscillator frequency to capacitance changes due to changes in the circuit board dielectric 22. At the same time, the group delay is significantly less than for waveform "B", with the attendant benefit. Thus, an engineering tradeoff can be made between the sources of error as the amount of voltage divider effect and of low-pass filter effect are varied.

Figure 8:
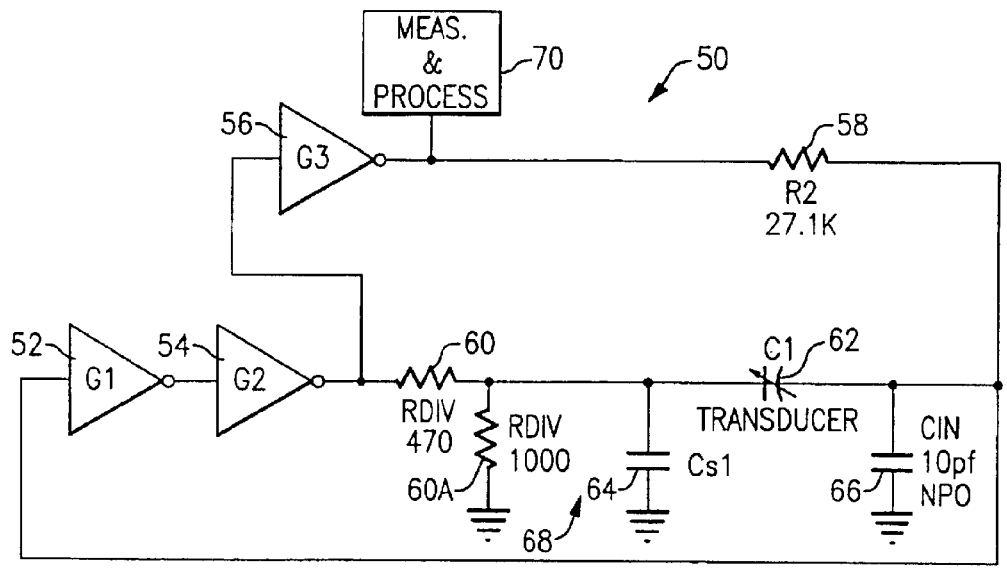
FIG. 8 is a schematic of an improved three-inverter oscillator circuit in accordance with a third embodiment the present invention.

As embodied herein and depicted FIG. 8, a schematic of an improved three-inverter oscillator circuit in accordance with a second embodiment the present invention is disclosed. This embodiment is identical to the embodiment depicted in FIG. 6, except that resistor 60A is placed in series with resistor 60 to form voltage divider 74. Voltage divider 74 functions in much the same way as capacitive voltage divider 68. Thus, the voltage waveform present at the input of gate 52 is very similar to waveform-C shown in FIG. 7 except that divider 74 results in a smaller group delay, and a smaller slope of approach to Point-D. However, it has the disadvantages of consuming more power and introducing other sources of error. One such error is caused by variations in the output impedance of gate 54. Gain errors are caused by changes in the ratio of resistor 60 to resistor 60A. However, the implementation of a gain correction method (discussed below) will be effective in reducing these effects on gain accuracy.

Figure 9:
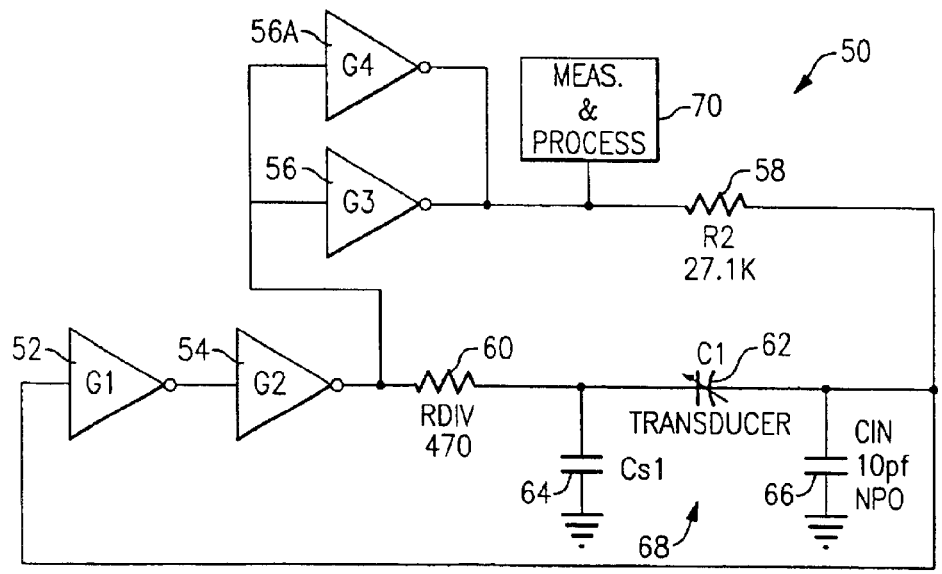
FIG. 9 is a schematic of an improved three-inverter oscillator circuit in accordance with a fourth embodiment the present invention.

FIG. 9 is a schematic of an improved three-inverter oscillator circuit in accordance with a third embodiment the present invention. This embodiment is identical to the embodiment depicted in FIG. 6, except that gate 56A is disposed in parallel with gate 56. In similar embodiments, gate 56A includes a plurality of gates in parallel with gate 56. Gate 56A functions to reduce the errors caused by changes in the output resistance of gate 56.

As shown in FIG. 6, FIG. 8, and FIG. 9, oscillator circuit 50 is connected to measurement/processing circuit 70, which includes counter 72. The method of counting the pulses from the oscillator is not important as long as it can measure the frequency with adequate resolution. The most straightforward methods are Frequency Counting and Period Averaging.

As embodied herein and depicted in FIG. 10, a block diagram of counter circuit 72 in accordance with a fourth embodiment the present invention is disclosed. In this embodiment, the frequency counting method is employed. Counter circuit 72 includes pulse counter 720 and gate generator 722. Gate generator 722 provides counter 720 with an enablement pulse with width $T_{gate}$. The frequency counting method counts the pulses from sensor oscillator 50 during a fixed interval of time $T_{gate}$, yielding a number N. The frequency of the result is then $N/T_{gate}$. This is very simple and economical, but requires a long time to obtain a given resolution. This can be improved by increasing the frequency of operation of sensor oscillator 50, but at a cost of larger drift errors in sensor oscillator 50 as the delay of the gates becomes more dominant in determining the frequency.

As embodied herein and depicted in FIG. 11, a block diagram of counter circuit 72 in accordance with a fifth embodiment the present invention is disclosed. This embodiment employs the period averaging method. Circuit 72 includes counter 720 coupled to divide-by-N counter 724 via switch SW. Divide-by-N counter 724 is also connected to oscillator circuit 50. The period averaging method offers an improvement in resolution over the previous embodiment at a given measurement repetition rate. In the instant embodiment, the frequency of sensor oscillator 50 is divided in divide-by-N counter 724 by a large fixed number N to create a gate signal. During the gate signal, high frequency reference oscillator 200 provides signal $F_{ref}$, which is counted to determine the length of the gate, a number M. This number gives a measure of the period of N cycles of the oscillator. The frequency is the equal to the value: $f_0 = F_{ref} * N/M$. The standard method of period averaging takes measurements over variable intervals of time depending on the frequency from sensor 50. The most important limitation is that the value of N must be small enough so that the measurement never takes longer than the desired measurement interval. Margin must be left for variations in pressure and in component tolerances. As a result, the measurement may only be occurring during as little as about ⅔ of the available time. This results in an increase in noise in the measurement of about 23% above the theoretical minimum. It is noted that, noise is an important parameter for automatic blood pressure measurement.

Figure 12:
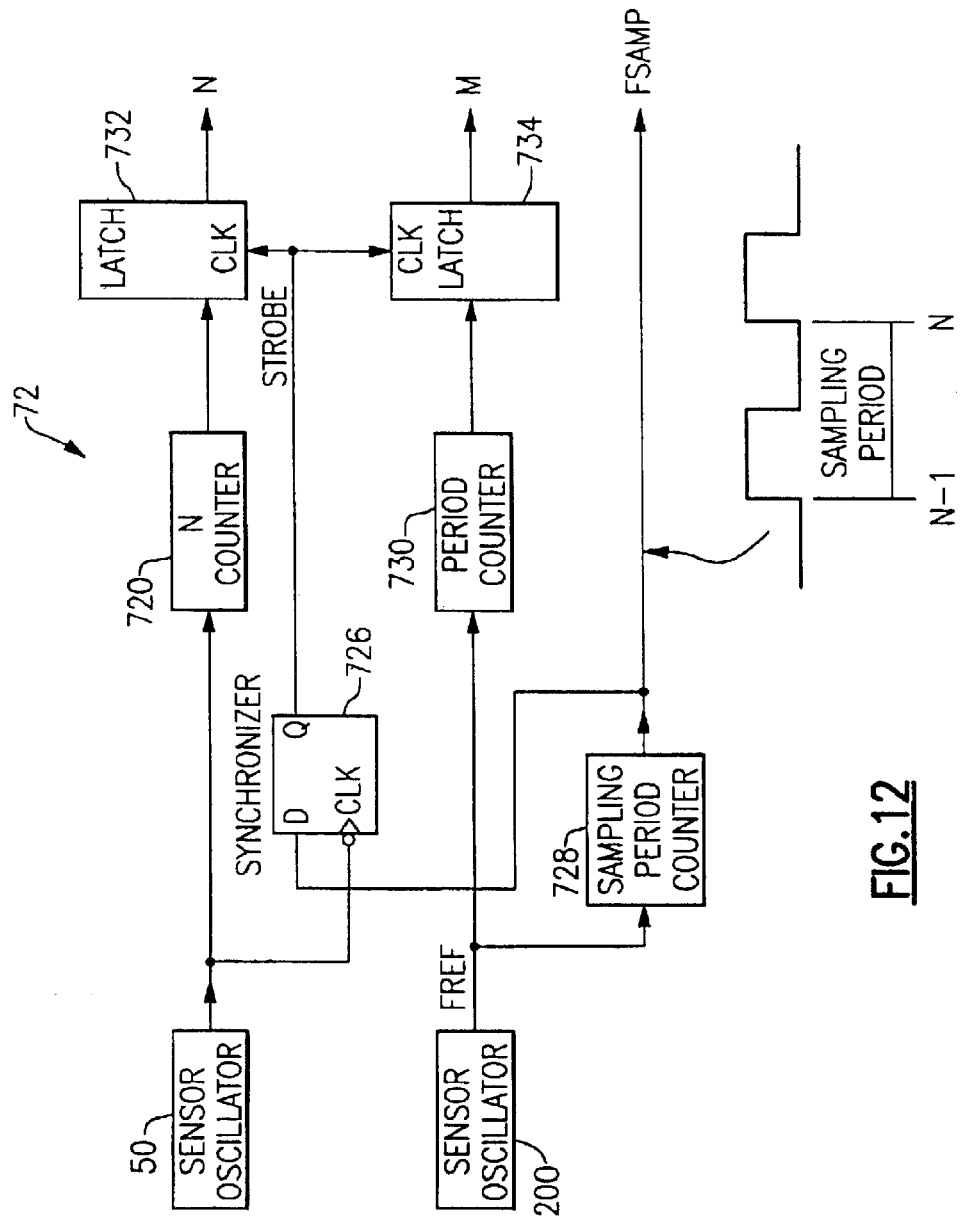
FIG. 12 is a block diagram of the counter circuit shown in FIG. 2 in accordance with a seventh embodiment the present invention.

As embodied herein and depicted in FIG. 12, a block diagram of counter circuit 72 in accordance with a sixth embodiment the present invention is disclosed. In this embodiment, circuit 72 uses a modified period averaging technique. Circuit 72 includes counter 720 connected to sensor oscillator 50 and latch 732. The frequency signal from sensor oscillator 50 is also used as the clock signal for D-flip-flop 726. The D-input is connected to the output of sampling period counter 728. The output Q of D-flip-flop 726 follows the value of $F_{samp}$ present during the falling edge of the clock signal. Reference oscillator 200 provides signal $F_{ref}$, which is the input signal to sampling period counter 728 and period counter 730. The output Q of D-flip-flop 726 is used to latch the output of counter 720 in latch 732, and it is used to latch that output of period counter 730 in latch 734. The output of latch 732 is value N, and the output of latch 734 is value M. This embodiment offers an improvement over the standard period averaging method. This method allows period averaging over 100% of the available time. The method counts the number of sensor 50 oscillator pulses N that begin within a given sampling period. This set of N pulses may take a slightly longer or slightly shorter time than the intended measurement interval, but such that the average time is exactly equal to the intended measurement interval (sampling period). The exact length of time taken by these pulses is determined by value M. The numbers are then divided to get the frequency of the sensor. In this method, the counters never stop counting. Instead, the values are sampled and latched at the appropriate moment to generate a series of data values. The value of N or M is then the difference in the latched values between the beginning of one interval and the beginning of the next interval. If the samples taken at the beginning of interval n are $N_n$ and $M_n$, and at the beginning of the previous interval are $N_{n-1}$ and $M_{n-1}$, then the frequency of the sensor oscillator is $$F_{sensor} = F_{ref} \frac{(N_n - N_{n-1})}{(M_n - M_{n-1})}.$$

Interrupt generator counter 728 creates the sampling frequency signal $F_{samp}$. D-type flip-flop 726 synchronizes this signal to sensor oscillator 50 to generate the Strobe signal. Additional flip-flops may be cascaded with 726 to improve metastability. The period of this Strobe matches the exact period of the N cycles of the sensor oscillator. Counter 720 counts the cycle s of the sensor oscillator during the Strobe signal, and Period Counter 730 counts the length of the period of the Strobe signal.

The values of N and M are sent to data processor 74. Processor 74 performs the calculations. The Strobe signal is connected to processor 74 to alert it that new data is available in latch 732 and latch 734. One of ordinary skill in the art will recognize that counter 720, counter 728, counter 730, latch 732, and latch 734 may be of any suitable type depending on the components used in the design, but there is shown by way of example counter 720, counter 728, counter 730, latch 732, and latch 734 being implemented as discrete components. However, in an alternate embodiment, counter 720, counter 730, latch 732, and latch 734 are integrated in data processor 74. Data processor 74 is implemented using a microcontroller or digital signal processor.

An explanation of the offset method of error correction and the gain method of error correction follows. In many measurement applications, significant errors in measurement can be caused by environmental changes such as temperature or physical orientation, by other external sources such as deformations caused by physical shock (drop on the floor), and by aging of materials and components. All of these "drift" errors occur after the product is calibrated in the factory. Thus, before using sensor 10, it is necessary to calibrate it in the field. If the offset method (explained below) is used to correct for drift, then the frequency standard to which the sensor frequency is compared must be stable over time. If the gain correction method of drift correction is used, all long-term drift of the reference oscillator will be perfectly cancelled because $F_{ref}$ is a purely multiplicative term in the above equations. This allows the use of a lower cost frequency standard such as a ceramic resonator or an L-C oscillator.

One way of calibrating sensor 10 is by taking one or more sensor readings that allow the calibration of the sensor to be effected by mathematical means. The greater the number of readings, the greater the calibration accuracy. However, in many applications such as pressure measurement the cost of providing multiple known stimuli is prohibitively expensive. Thus, low-cost calibration is restricted to one measurement. Typically, the "zero-pressure" measurement is taken for a differential pressure measurement application because it is the lowest-cost option. However, with only one reference measurement available, there is no information about the characteristics of the error except for its magnitude. Thus the mathematical method of correction is by necessity, restricted to a simple one.

For most measurements, when a zero pressure reading is used, it is customary to assume that the error is in the form of an offset. Thus, an "offset correction" method is employed whereby the calculated error is subtracted from all subsequent measurements. In another embodiment, the reference measurement can be used to select from one of a series of curves or equations to model the error. The amount of correction is then determined by applying the selected curve or equation to the reading obtained from the unknown stimulus. In yet another embodiment, the calculated error is treated as a gain error that is corrected by multiplying subsequent readings by a correction factor.

When the offset method of correction is applied to a capacitive sensor, it does a good job of correcting for changes in the spacing d, but does poorly at correcting for changes in the area of the plates A and changes in the oscillator. This is because these changes are mostly changes in gain rather than offset. As a result, the gain errors are only partially compensated for, and the sensor will have span errors caused by these imperfections. To hold a given level of accuracy it is then necessary to incur extra expense to make the oscillator more stable. Similar errors occur when the offset method is applied to errors caused by voltage dividers. An example of this would be the voltage divider formed by resistance R3 in combination with the input capacitance of gate G1 in the conventional circuit in FIG. 1. Changes in attenuation cause the frequency of the relaxation oscillator to shift by essentially the same percentage for all frequencies of operation. Therefore, the amount of offset correction required varies with frequency, and it is not well corrected.

On the other hand, the gain correction method does an excellent job of correcting gain changes in the oscillator. With respect to FIG. 6, FIG. 8, and FIG. 9, errors can be induced by changes in resistances that work in combination with the sensor to determine operating frequency (e.g. resistor 58), variations in the performance of the voltage dividers, or by changes in threshold voltage at gate 52. Those skilled in the art will also recognize that stray capacitances to ground in oscillator 50 act primarily like voltage dividers, and are thus corrected by the method. Changes in delay of the oscillator are essentially uncorrected, but these can easily be kept small.

Figure 13:
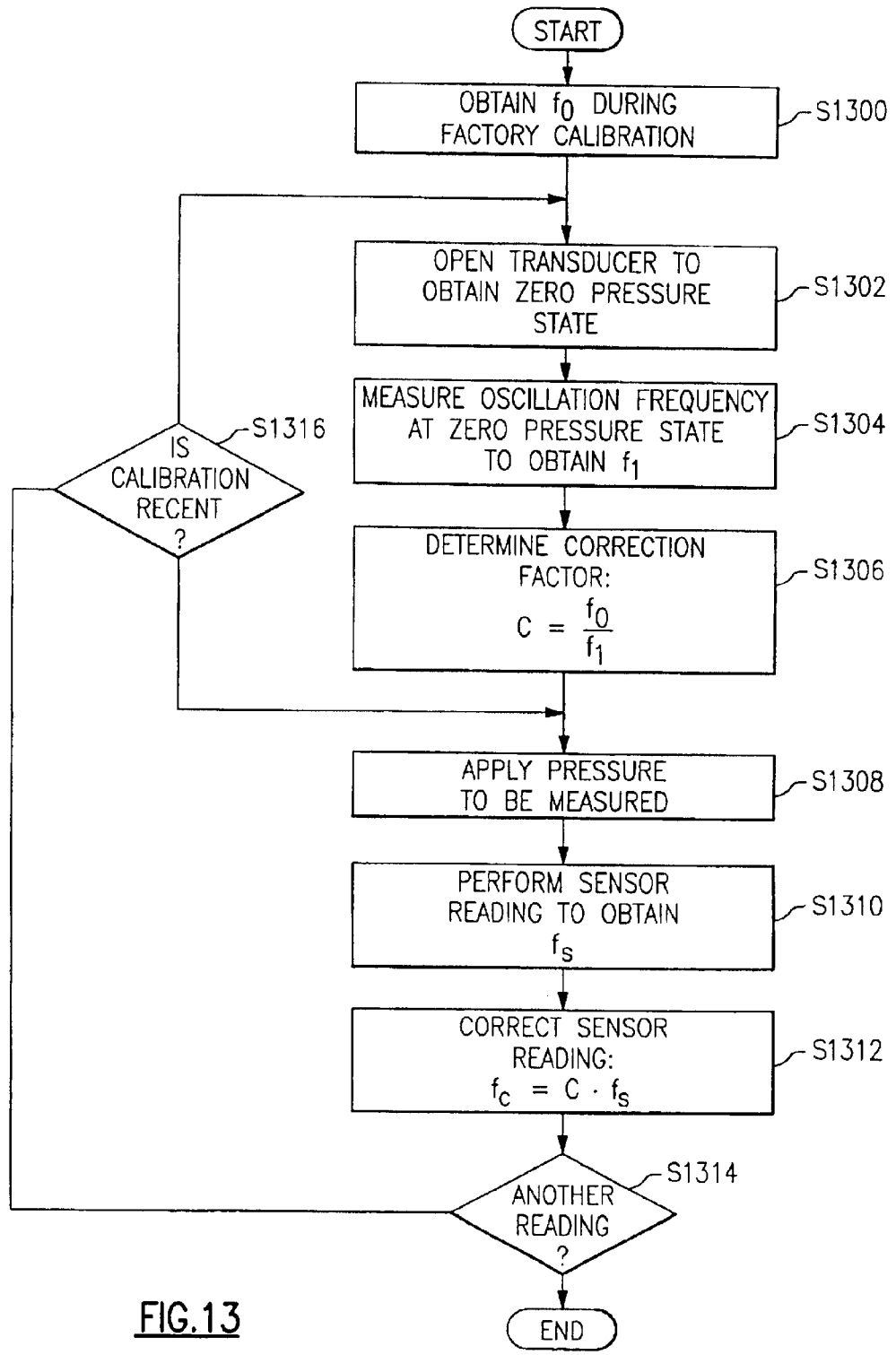
FIG. 13 is a flow chart showing a method for calibrating the present invention.

As embodied herein and depicted in FIG. 13, a flow chart showing a gain correction method for calibrating capacitive pressure sensor 10 is disclosed. In step s1300, a factory calibration zero pressure frequency $f_0$ is obtained. The frequency of sensor oscillator 50 is read when transducer 100 is operating under zero-pressure conditions. This value is stored in PROM in processor 74 and is used in all subsequent field calibration calculations. In step s1302, the transducer valve is opened to obtain the zero-pressure state in the ambient environment. In step s1304, the oscillation frequency is measured in the zero pressure state to obtain the field zero pressure frequency $f_1$. Processor 74 retrieves $f_0$ from memory and calculates the correction factor $C=f_0/f_1$. Subsequently, sensor 10 is ready for use. When taking a measurement, sensor 10 will obtain a frequency value $f_s$ for some pressure value other than zero. Before displaying or recording the pressure measurement, processor 74 corrects the measurement by applying the correction factor C, whereby: $f_{correct}=(C)*(f_s)$. If another measurement is taken, the calibration routine is performed again if the calibration is not recent and calibration is completed automatically in a fraction of a second. If the calibration is recent, the operational flow jumps to step s1308. Thus, sensor 10 is calibrated as needed to conform to the ambient environmental conditions.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A capacitive sensor for measuring a stimulus parameter, the sensor comprising:

a circuit board including at least one metallic layer;

a metallic diaphragm coupled to the circuit board and juxtaposed to the metallic layer to thereby form a transducer capacitor characterized by a capacitance, the metallic diaphragm being adapted to move relative to the at least one metallic layer in response to a chance in the stimulus parameter, whereby the capacitance changes in accordance with the chance in the stimulus parameter; and an oscillator circuit including a low-pass filter and coupled to the transducer capacitor, the oscillator circuit being configured to generate a filtered signal characterized by a frequency, whereby the frequency changes in accordance with capacitance changes further comprising:

a conductive ring disposed between the metallic diaphragm and the circuit board; and a pressure port assembly coupled to the conductive ring, whereby a cavity is formed between a pressure port and the metallic diaphragm, the pressure port assembly further comprises comprising:

a snap-on cap coupled to the conductive ring; and a compressible sealer element disposed between the snap-on cap and the metallic diaphragm, whereby substantially symmetrical forces are applied to the metallic diaphragm to thereby seal the cavity.

2. The sensor of claim 1, wherein the compressible sealer element has a substantially rectangular cross-section.

3. The sensor of claim 1, wherein the compressible sealer element includes an o-ring.

4. A capacitive sensor for measuring a stimulus parameter, the sensor comprising:

a circuit board including at least one metallic layer;

a metallic diaphragm coupled to the circuit board and juxtaposed to the metallic layer to thereby form a transducer capacitor characterized by a capacitance, the metallic diaphragm being adapted to move relative to the at least one metallic layer in response to a change in the stimulus parameter, whereby the capacitance changes in accordance with the change in the stimulus parameter; and an oscillator circuit including a low-pass filter and coupled to the transducer capacitor, the oscillator circuit being configured to generate a filtered signal characterized by a frequency, whereby the frequency changes in accordance with capacitance changes further comprising:

a conductive ring disposed between the metallic diaphragm and the circuit board; and a pressure port assembly coupled to the conductive ring, whereby a cavity is formed between a pressure port and the metallic diaphragm wherein the circuit board includes a metallic land disposed between the conductive ring and the circuit board, the metallic land being adapted to support the conductive ring.

5. The sensor of claim 4, wherein the metallic land is co-planar with the at least one metallic layer.

6. A capacitive sensor for measuring a stimulus parameter, the sensor comprising:
- a circuit board including at least one metallic layer;
- a metallic diaphragm coupled to the circuit board and juxtaposed to the metallic layer to thereby form a transducer capacitor characterized by a capacitance, the metallic diaphragm being adapted to move relative to the at least one metallic layer in response to a change in the stimulus parameter, whereby the capacitance chances in accordance with the change in the stimulus parameter; and
- an oscillator circuit including a low-pass filter and coupled to the transducer capacitor, the oscillator circuit being configured to generate a filtered signal characterized by a frequency, whereby the frequency chances in accordance with capacitance chances
  - wherein the circuit board includes at least one guard ring disposed within a thickness of the circuit board, the guard ring being adapted to reduce stray capacitance between the metallic diaphragm and the metallic layer.

7. The sensor of claim 6, wherein the at least one guard ring mitigates the effects of sensor performance variations due to temperature induced variations of a dielectric constant of the circuit board.

8. A capacitive sensor for measuring a stimulus parameter, the sensor comprising:
- a circuit board including at least one metallic layer;
- a metallic diaphragm coupled to the circuit board and juxtaposed to the metallic layer to thereby form a transducer capacitor characterized by a capacitance, the metallic diaphragm being adapted to move relative to the at least one metallic layer in response to a change in the stimulus parameter, whereby the capacitance chances in accordance with the change in the stimulus parameter;
- an oscillator circuit including a low-pass filter and coupled to the transducer capacitor, the oscillator circuit being configured to generate a filtered signal characterized by a frequency, whereby the frequency chances in accordance with capacitance changes wherein the low-pass filter includes an impedance element coupled to a first shunt capacitor; and
  - a second capacitor disposed between the transducer capacitor and AC ground to form a voltage divider.

9. The sensor of claim 8, wherein the low-pass filter includes a series impedance element coupled to the input of the transducer, and a capacitor disposed between an output of the transducer and AC ground to thereby form a voltage divider.

10. The sensor of claim 9, wherein the series impedance element includes a resistor, or an inductor, or both.

11. The sensor of claim 10, wherein the second capacitor forms a capacitance divider with an inter-plate capacitance generated between the metallic diaphragm and the metallic layer.

12. The sensor of claim 11, wherein the capacitance divider is configured to reduce diode conduction within an input circuit of the oscillator.

13. A capacitive sensor system for measuring a stimulus parameter, the system comprising:
- a circuit board including at least one metallic layer disposed therein;
- a metallic diaphragm coupled to the circuit board to thereby form a variable capacitor, the variable capacitor being characterized by a variable capacitance, the metallic diaphragm being adapted to move relative to the at least one metallic layer in response to a change in a stimulus parameter, such that the capacitance is varied in accordance with stimulus parameter changes;
- an oscillator circuit disposed on the circuit board and coupled to the variable capacitor, the oscillator circuit including a low-pass filter configured to generate a filtered signal characterized by a frequency that changes in accordance with the capacitance; and
- a processor coupled to the oscillator circuit, the processing circuit being configured to derive a value of the stimulus parameter from the frequency.

14. The system of claim 13, wherein the at least one metallic layer includes two co-planar electrodes disposed on a surface of the circuit board.

15. The system of claim 14, wherein the metallic diaphragm is grounded.

16. The system of claim 14, wherein the two c-oplanar electrodes are inter-digitated.

17. The system of claim 14, wherein the two co-planar electrodes are characterized by a spiral shape.

18. The system of claim 14, further comprising a ground conductor layer disposed on a second surface of the circuit board parallel to the surface of the circuit board, whereby the ground conductor layer and the metallic diaphragm shield the two co-planar rings from AC-signals.

19. The system of claim 13, wherein the processor includes a gain correction circuit, the gain correction circuit being configured to multiply a number representing the frequency by a correction factor.

20. The system of claim 19, wherein the correction factor equals an initial zero stimulus parameter frequency value divided by an ambient zero stimulus parameter frequency value.

21. The system of claim 13, wherein the processing circuit includes a counter circuit configured to determine the frequency of the filtered signal.

22. The system of claim 21, wherein the counter circuit employs a frequency counting method.

23. The system of claim 21, wherein the counter circuit employs a period averaging method.

24. The system of claim 21, wherein the counter circuit employs a period averaging method that counts frequency pulses within a sampling period.

25. The system of claim 24, wherein the period averaging method determines the frequency by solving the equation, frequency=$F_{ref}*[(N_n-N_{n-1})/(M_n-M_{n-1})]$, wherein n is the sampling period, $N_n-N_{n-1}$, is a number of pulses counted in the sampling period, and $M_n-M_{n-1}$ is a number of clock periods occurring during sampling period n.

26. The system of claim 25, wherein Fref is a constant.

27. The system of claim 25, wherein Fref is a reference frequency.

28. The system of claim 13, wherein the stimulus parameter is pressure.

29. The system of claim 13, wherein the stimulus parameter is force.

30. The system of claim 13, wherein the stimulus parameter is displacement.

31. A method for calibrating a capacitive sensor used to measure a stimulus parameter, the method comprising:
- providing a sensor including a capacitor transducer and an oscillator circuit, the capacitor transducer being characterized by a variable capacitance that varies in accordance with a change in the stimulus parameter;
- determining a correction factor by comparing an initial condition to an ambient condition;

determining the frequency corresponding to the stimulus parameter during ambient conditions; and correcting the stimulus parameter by multiplying the correction factor by the frequency, whereby a corrected frequency value is obtained.

32. The method of claim 31, wherein the step of determining further comprises the step of:

obtaining an initial condition factory oscillation frequency valve ($f_0$);

obtaining an initial condition ambient oscillation frequency valve ($f_1$); and dividing the initial condition factory oscillation frequency value by the initial condition ambient oscillation frequency value.

33. The method of claim 32, wherein the initial condition factory oscillation frequency value is obtained when the sensor is configured in a zero stimulus state.

34. The method of claim 32, wherein the initial condition ambient oscillation frequency value is obtained when the sensor is configured in a zero stimulus state.

35. The method of claim 32, wherein the correction factor equals, $C=f_0/f_1$.

36. The method of claim 35, wherein the corrected frequency equals, $f_c=C*f_S$, $f_S$ being the frequency corresponding to the stimulus parameter during ambient conditions.

37. The method of claim 31, wherein the stimulus parameter is pressure.

38. The method of claim 31, wherein the stimulus parameter is force.

39. The method of claim 31, wherein the stimulus parameter is displacement.

40. The method of claim 31, wherein the stimulus parameter is humidity.

41. A capacitive pressure sensor for measuring a stimulus parameter, the sensor comprising:

a circuit board including at least one metallic layer;

a metallic diaphragm coupled to the circuit board and juxtaposed to the metallic layer to thereby form a transducer capacitor characterized by a capacitance, the metallic diaphragm becoming substantially curved relative to the at least one metallic layer in response to a change in the stimulus parameter such that the capacitance changes in accordance with stimulus parameter changes; and an oscillator circuit disposed on the circuit board and coupled to the transducer capacitor, the oscillator circuit being configured to generate a signal characterized by a frequency that changes in accordance with capacitance changes.

42. A capacitive sensor for measuring a stimulus parameter, the sensor comprising:

a circuit board including at least one metallic layer;

a metallic diaphragm coupled to the circuit board and juxtaposed to the metallic layer to thereby form a transducer capacitor characterized by a capacitance, the metallic diaphragm being adapted to move relative to the at least one metallic layer in response to a change in the stimulus parameter such that the capacitance changes in accordance with stimulus parameter changes;

at least one guard ring disposed within a thickness of the circuit board, the guard ring being adapted to reduce stray capacitance between the metallic diaphragm and the metallic layer; and an oscillator circuit coupled to the transducer capacitor, the oscillator circuit being configured to generate a signal characterized by a frequency that changes in accordance with capacitance changes.

43. A capacitive sensor for measuring a stimulus parameter, the sensor comprising:

a circuit board including at least one metallic layer;

a metallic diaphragm coupled to the circuit board and juxtaposed to the metallic layer to thereby form a transducer capacitor characterized by a capacitance, the metallic diaphragm not including an attached metallic plate, the metallic diaphragm being adapted to move relative to the at least one metallic layer in response to a change in the stimulus parameter such that the capacitance changes in accordance with stimulus parameter changes; and an oscillator circuit disposed on the circuit board an coupled to the transducer capacitor, the oscillator circuit being configured to generate a signal characterized by a frequency that changes in accordance with capacitance changes.

* * * * *

UNITED STATES PATENT AND TRADEMARK OFFICE
CERTIFICATE OF CORRECTION

PATENT NO. : 6,828,801 B1
DATED : December 7, 2004
INVENTOR(S) : Kenneth Burdick, Raymond A. Lia and Robert L. Vivenzio It is certified that error appears in the above-identified patent and that said Letters Patent is hereby corrected as shown below:

Column 14,
Line 14, the word "chance" is incorrect, please replace with the word -- changes --; and
Line 16, the phrase with the "chance" should read -- with the change --; and
Line 29, the word "comprises" should be omitted.

Column 15,
Lines 10 and 17, the word "chances" is incorrect in each instance; please replace with the word -- changes --.
Lines 36 and 42, the word "chances" is incorrect, please replace with the word -- changes --.

Signed and Sealed this

First Day of March, 2005

JON W. DUDAS
*Director of the United States Patent and Trademark Office*